US012708863B2

(12) United States Patent
Chabot et al.

(10) Patent No.: US 12,708,863 B2
(45) Date of Patent: Aug. 18, 2026

(54) SYSTEM AND PROCESS FOR CONCENTRATING BRIX IN A LIQUID

(71) Applicant: Les Equipements D'Erabliere C.D.L. Inc, Saint-Lazare-de-Bellechasse (CA)

(72) Inventors: Vallier Chabot, Armagh (CA); Steve O'Farrell, Ste-Claire (CA)

(73) Assignee: Les Equipements D'Erabliere C.D.L. Inc, Saint-Lazare-de-Bellechasse (CA)

( * ) Notice: Subject to any disclaimer, the term of this patent is extended or adjusted under 35 U.S.C. 154(b) by 216 days.

(21) Appl. No.: 18/313,791

(22) Filed: May 8, 2023

(65) Prior Publication Data

US 2023/0356103 A1 Nov. 9, 2023

Related U.S. Application Data

(60) Provisional application No. 63/339,490, filed on May 8, 2022.

(51) Int. Cl.

| | |
|---|---|
| ***B01D 1/28*** | (2006.01) |
| ***A23L 2/385*** | (2006.01) |
| ***B01D 1/04*** | (2006.01) |
| ***B01D 1/22*** | (2006.01) |

(52) U.S. Cl.

CPC ................ *B01D 1/28* (2013.01); *A23L 2/385* (2013.01); *B01D 1/04* (2013.01); *B01D 1/22* (2013.01); *B01D 1/2896* (2013.01)

(58) Field of Classification Search

CPC ........... A23L 2/385; B01D 1/04; B01D 1/065; B01D 1/22; B01D 1/28; B01D 1/2896

See application file for complete search history.

(56) References Cited

U.S. PATENT DOCUMENTS

| | | | | |
|---|---|---|---|---|
| 5,772,850 | A | 6/1998 | Morris | |
| 6,988,332 | B2 | 1/2006 | Harvey | |
| 2015/0190729 | A1 * | 7/2015 | Christensen | B01D 1/28 202/186 |

FOREIGN PATENT DOCUMENTS

| | | | | |
|---|---|---|---|---|
| CN | 111318038 A * | 6/2020 | | B01D 1/26 |
| EP | 3647439 A1 * | 5/2020 | | B01D 1/26 |
| WO | WO-2020183498 A2 * | 9/2020 | | B01D 1/221 |

OTHER PUBLICATIONS

Yang, Junling et al., "Study on mechanical vapor recompression system with wet compression single screw compressor", Applied Thermal Engineering 103(2016), pp. 205-211 (Year: 2016).*
English machine translation of CN 111318038 (Year: 2020).*
Garrett, L.D., Processing Maple Syrup with a Vapor Compression Distiller: An Economic Analysis, Forest Service Research Paper NE-385, 1977, pp. 1-12.
Chad Sharrow, "Electric sap releaser", YouTube, https://www.youtube.com/watch?v=0loh-tN7c_E, Dec. 12, 2016 (Dec. 12, 2016), [retrieved from Internet Jun. 13, 2024].

* cited by examiner

*Primary Examiner* — Renee Robinson
(74) *Attorney, Agent, or Firm* — Snyder, Clark, Lesch & Chung, LLP

(57) ABSTRACT

There is provided a system and process for concentrating Brix in a liquid using a bimodal vacuum and pressurized falling film evaporator for producing concentrated nectar and/or concentrated syrup products, wherein in the vacuum mode the system produces concentrated nectar having a Brix of 60 to 70%, and wherein the pressurized mode, the system produces concentrated syrup having a Brix of 66 to 67%.

19 Claims, 10 Drawing Sheets

300
400
141
143
147
162
160
190
191
B
163
161
140
145
200
144
170

T
148
180
126
700b
T
700d
T
122
123
100
120
124
121
700a
T
700c
T
125
1000
110

SYSTEM AND PROCESS FOR CONCENTRATING BRIX IN A LIQUID

CROSS-REFERENCE TO OTHER APPLICATIONS

This application claims the benefit of U.S. provisional application Ser. No. 63/339,490, filed on May 8, 2022, the contents of which are hereby incorporated herein by reference in their entirety.

TECHNICAL FIELD

The present technology relates to a system and process for concentrating Brix in a liquid using a bimodal vacuum and pressurized falling film evaporator for producing concentrated nectar and/or concentrated syrup products, for example from maple sap such as maple tree sap, wherein in the vacuum mode the system produces concentrated nectar or syrup having a predetermined Brix range. For example, the present technology produces a nectar or syrup Brix of 60 to 70%, and wherein during operation in a pressurized mode, the system produces concentrated nectar or syrup, for example maple syrup, having a Brix of 66 to 67%.

BACKGROUND OF THE ART

The maple syrup industry, which has produced maple syrup in an artisanal way for a hundred years until the 1960s, has undergone transformation towards industrialization in order to initiate an increase in production performance and to lower production costs.

The classical way of harvesting sap was to tap the tree trunks during spring time using piercing spouts and buckets hanging below the piercing spouts. Thereafter, each bucket was to be emptied one by one into a large container, which was pulled by a horse, a tractor or another type of all-terrain vehicle in the sugar bush. Subsequently, the sap from the large container was sent to the sugar shack in order to be boiled using an evaporator to obtain a 66% to 67% Brix sugar maple syrup. The main problem with the classical way of collecting maple sap was that maple growers were unable to expand their business due to the huge workload required to harvest sap from trees. As a result, reaching profitability of maple syrup productions became increasingly challenging.

In the 70s, an alternative method of collecting maple sap was developed. This alternative way involved collecting the sap from the maple trees using a tubing system instead of buckets, much the same way as in the dairy industry. This collection method was made possible thanks to spouts being linked by a network of tubing and lines permanently installed on the entire sugar bush area and coupled to these spouts, where the sap of each of the maple trees is conveyed to a pumping station, which is then routed to the main sugar shack to be transformed into maple syrup. In many instances, the network of tubing is under vacuum, while in other instances the topography of the land allows the sap to descend by gravity to the pumping or harvesting station, thereby allowing the sap to be harvested in this way. Since they did not require a human presence as extensive as the classical bucket method, map sap collection systems allowed maple producers to significantly expand their businesses and make these much more profitable.

In the early 1980s, manually operated osmosis systems were introduced in the maple sugaring industry. Similar systems were already used in the maritime field in order to allow boats to produce their own drinking water using sea water. In the maple industry, however, the initial liquid is maple sap. The reverse osmosis transfers through a membrane the water contained in the maple sap thereby achieving a concentrated sap which becomes a syrup. Several reverse osmosis systems in the maple sugaring industry have been developed in order to optimize the performance and avoid clogging of membranes (filter) used to process the sweet sap.

Since the 1990s, automation has become increasingly important in the production of maple syrup because finding personnel and/or operators for operating maple syrup production facilities has become a constant challenge and, the profitability of such facilities and enterprises an important factor to ensure long-term viability. Thus, in addition to relying on tubing networks to collect maple sap, producers have considered a number of technologies to improve efficiency and time required for production, including automated reverse osmosis apparatuses, evaporators, pumps and computerized controls for these apparatuses.

However, there remains a need for a more efficient systems, processes and equipment to concentrate maple sap or other sweet vegetal water without denaturing or altering the nutritional properties or taste of the product. Also, the energy consumption of the system must be optimized in view of increasing energy costs.

In addition, the demand for maple products is growing. The interest of several companies in the food sector for goods (such as energy drinks, alcohol, fertilizers, distilleries, animal nutrition, etc.) to have a natural sweetening agent such as maple sap (or sweetened vegetable water) which is not traditional syrup, which is high in nutrients, and which can be preserved at room temperature is increasing. Since 2013, the demand for maple sap in terms of volume has increased to 7 million liters in 2019. This natural liquid extracted from sugar maple trees is composed mainly of water and sucrose (2 to 3%). Its other constituents are organic compounds such as reducing sugars (glucose and fructose) and nitrogen compounds (peptides and amino acids). This chemical composition makes it a favorable environment for the growth of microorganisms. The sap is practically sterile when extracted from the tree, but is subsequently contaminated at the tapping spout and in the collection system. The rate of contamination is strongly influenced by the temperature outside and the storage time of the sap in the tubing or collection tanks. This contamination significantly affects the quality of maple sap and its derived products.

Processes and systems for concentrating Brix in a liquid have been previously described. See for example, US Patent Publication No. US2021/0195930. In such processes and systems, a concentrated syrup product having a Brix value of 66% may be produced by heating the sap in a thermal evaporator to expose the concentrated product to high temperatures between 100° C. and 105° C., thereby increasing Maillard reactions and caramelizing the product, wherein the concentrated syrup product is produced. Such systems may expose the concentrated product to excessive heat, or to high heat for excessive amounts of time, and are not convenient to automate, requiring frequent monitoring and/or intervention by personnel.

There remains a need for a process and system that would improve the production of concentrated syrup product or a concentrated nectar product, for example by increasing efficiency, preserving taste and other properties of the liquid, or overcoming at least one of the above-identified drawbacks.

SUMMARY

In accordance with a broad aspect of the present technology, there is provided a system for concentrating Brix in a liquid, the system comprising: a first pump in fluid communication with a main inlet pipe for supplying the liquid into the system; a preheating unit for preheating the liquid at a first temperature (T1), the preheating unit comprising: a first inlet opening, a second inlet opening, a first outlet opening, and a second outlet opening, the first inlet opening being in fluid communication with the first pump for pumping the liquid into the preheating unit, the second inlet opening being in fluid communication with a second pump for draining condensed water through the preheating unit and through a second outlet opening, wherein the liquid flows through the first outlet opening and into the system at the first temperature (T1); a falling film evaporator in fluid communication with the first outlet opening of the preheating unit, the falling film is adapted to produce a concentrated product, and wherein the falling film evaporator comprises: (i) a housing comprising an accommodating cavity, a plurality of heat exchange tubes extending along a longitudinal axis in relation to the housing, a top outlet opening, a bottom outlet opening in fluid communication with a recirculating pump, a first inlet opening in fluid communication with the first outlet opening of the preheating unit, a second inlet opening, and a first outlet opening in fluid communication with a depressurizing tank that is in fluid communication with the second pump of the preheating unit; (ii) a spray tube comprising a plurality of spraying nozzles for spaying the liquid inside the housing; and (iii) a heating unit for heating the liquid at a second temperature (T2); a vapor recompression unit for compressing and decompressing steam, the mechanical vapor recompression unit comprising: (i) a first inlet opening in fluid communication with the top outlet opening of the falling film evaporator; (ii) a first outlet opening in fluid communication with the second inlet opening of the falling film evaporator; and (iii) a spraying nozzle for spraying water into the first inlet opening of the vapor recompression unit to reduce the heat therein; and a main outlet pipe in fluid communication with the recirculating pump, the main outlet pipe comprising a Brix reading apparatus for measuring Brix of the concentrated nectar product and the concentrated syrup product wherein the system and/or the vapor recompression unit is adapted to operate under a nectar mode for producing concentrated nectar product and under a syrup mode for producing concentrated syrup product.

In accordance with another broad aspect of the present technology, there is provided a process for concentrating Brix in a liquid, the process comprising the steps of providing an evaporation system as described herein, providing the liquid, actioning the steam generator to initiate a first production of steam, the resulting heat generated being directed from the steam generator to the falling film evaporator exiting through the first outlet opening of the falling film evaporator onto the depressurizing tank and pumped into the preheating unit by the second pump to heat the liquid at the first temperature (T1) to produce a first preheated liquid, feeding the first preheated liquid to the second preheating unit for preheating the liquid at the second temperature (T2) to produce a second preheated liquid, directing the second preheated liquid to the spray tube and spraying the second preheated liquid on the plurality of heat exchange tubes by actioning the plurality of spraying nozzles, and further comprising: gradually actioning the mechanical vapor recompression unit to function in the nectar mode, heating the second preheated liquid to the third temperature (T3) concentrating the Brix in the liquid between 60% to 70% and recovering the concentrated nectar product having a Brix value between 60% to 70%, or actioning the mechanical vapor recompression unit to function in the syrup mode, heating the liquid to the fourth temperature (T4) concentrating the Brix in the liquid between 66% and 67% and recovering the concentrated syrup product having a Brix value between 66% and 67%.

In accordance with another broad aspect of the present technology, there is provided a process for concentrating Brix in a liquid, the process comprising the steps of providing the liquid, preheating the liquid to a first preheated temperature to produce a first preheated liquid, preheating the first preheated liquid to a second preheated temperature to produce a second preheated liquid, and further comprising feeding the second preheated liquid to a falling film evaporator configured to function under a nectar mode and heating the second preheated liquid to a temperature between 37° C. and 103° C. to produce a concentrated nectar product having a Brix level between 60% and 70%, or feeding the second preheated liquid to a falling film evaporator configured to function under a syrup mode and heating the second preheated liquid to a temperature between 85° C. and 103° C. to produce a concentrated syrup product having a Brix level between 66% and 67%.

In accordance with a further broad aspect of the present technology, there is provided a process for concentrating Brix in a liquid, the process comprising the steps of: providing a system as described herein; providing the liquid; actioning the steam generator to initiate a first production of steam, wherein the resulting heat generated is directed from the steam generator to the falling film evaporator, exiting through the first outlet opening of the falling film evaporator onto the depressurizing tank, and pumped into the preheating unit by the second pump to heat the liquid at the first temperature (T1) to produce a first preheated liquid; feeding the first preheated liquid to the second preheating unit for preheating the liquid at the second temperature (T2) to produce a second preheated liquid; directing the second preheated liquid to the spray tube and spraying the second preheated liquid on the plurality of heat exchange tubes by actioning the plurality of spraying nozzles; gradually actioning the mechanical vapor recompression unit to function in the nectar mode; heating the second preheated liquid to the third temperature (T3) concentrating the Brix in the liquid between 60% to 70%; and producing the concentrated nectar product having a Brix value between 60% to 70%, or, after the step of directing the second preheated liquid to the spray tube and spraying the second preheated liquid on the plurality of heat exchange tubes by actioning the plurality of spraying nozzles, the process comprises the steps of actioning the mechanical vapor recompression unit to function in the syrup mode; heating the liquid to the fourth temperature (T4) concentrating the Brix in the liquid between 66% and 67%; and producing the concentrated syrup product having a Brix value between 66% and 67%.

In accordance with another broad aspect of the present technology, there is provided a process for concentrating Brix in a liquid, the process comprising the steps of: providing the liquid; preheating the liquid to a first preheated temperature (T5) to produce a first preheated liquid; preheating the first preheated liquid to a second preheated temperature (T6) to produce a second preheated liquid; feeding the second preheated liquid to a falling film evaporator configured to function under a nectar mode; and heating the second preheated liquid to a temperature between 37° C. and 103° C. to produce a concentrated nectar liquid having a Brix level between 60% and 70%; or after the step of preheating the first preheated liquid to a second preheated temperature (T6) to produce a second preheated liquid, the process comprises the steps of feeding the second preheated liquid to a falling film evaporator configured to function under a syrup mode; and heating the second preheated liquid to a temperature between 85° C. to 103° C., for example between 97° C. and 98° C. to produce a concentrated syrup liquid having a Brix level between 66% and 67%.

BRIEF DESCRIPTION OF THE DRAWINGS

Having thus generally described the nature of the present disclosure, reference will now be made to the accompanying drawings, showing by way of illustration example embodiments thereof and in which.

DETAILED DESCRIPTION OF EMBODIMENTS

Figure 1:
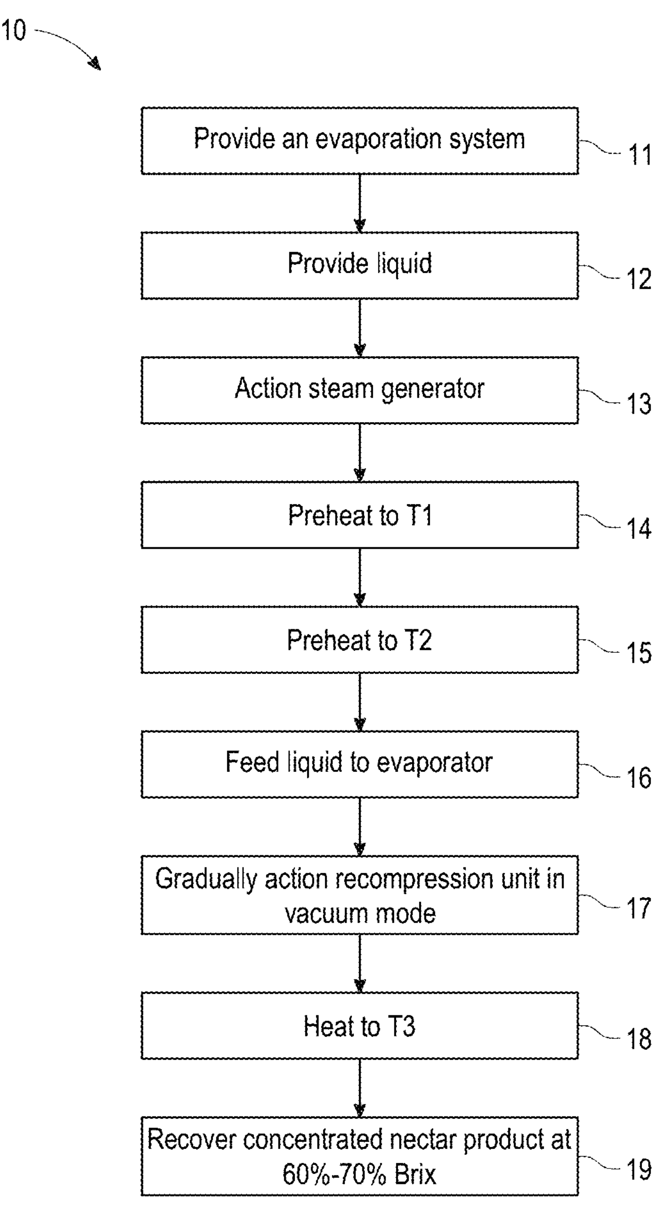
FIG. 1 is a schematic diagram of an evaporation process operating in a vacuum configuration to concentrate Brix in a liquid, according to an embodiment of the present disclosure.

In the following description, the same numerical references refer to similar elements. Furthermore, for the sake of simplicity and clarity, namely so as to not unduly burden the figures with several reference numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, it will be appreciated that positional descriptions such as "above", "below", "forward", "rearward", "left", "right" and the like should, unless otherwise indicated, be taken in the context of the figures only and should not be considered limiting. The use of "including," "comprising," or "having" and variations thereof herein is meant to encompass the items listed thereafter and equivalents thereof as well as additional suitable items. Unless specified or limited otherwise, the terms "mounted," "connected," "supported," and "coupled" and variations thereof are used broadly and encompass both direct and indirect mountings, connections, supports, and couplings and are thus intended to include direct connections between two members without any other members interposed therebetween and indirect connections between members in which one or more other members are interposed therebetween. Further, "connected" and "coupled" are not restricted to physical or mechanical connections or couplings. Additionally, the words "lower", "upper", "upward", "down" and "downward" designate directions in the drawings to which reference is made.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that where the claims or specification refer to "a" or "an" element, such reference is not to be construed that there is only one of that element. It is to be understood that where the specification states that a component, feature, structure, or characteristic "may", "might", "can" or "could" be included, that particular component, feature, structure, or characteristic is not required to be included.

Variants, examples and preferred embodiments of the present disclosure are described hereinbelow. According to one embodiment, there is a system and process for concentrating Brix in a liquid using a bimodal vacuum and pressurized falling film evaporator for producing concentrated nectar and/or concentrated syrup products, wherein in the vacuum or nectar mode the system produces concentrated nectar having a Brix of 60 to 70%, and wherein in the pressurized or syrup mode, the system produces concentrated syrup having a Brix of 66 to 67%. Also whenever numerical values, such as Brix percentage values, are referred to in this specification, these values imply and include variations of approximately more or less 10% of the stated numerical values.

In embodiments, the system of the present technology uses a falling film evaporator that works in conjunction with a vapor compression unit, such as a mechanical recompression unit or the like, adaptable to work under a nectar mode or under a syrup mode.

In embodiments, under the nectar mode, the system produces a concentrated product from the liquid, such as the sap of the maple tree or the sweet vegetal water, that is very close to the original starting liquid without significantly altering the very nature of the product (e.g. nutritional value), therefore without denaturing or altering the nutritional properties of a resulting concentrated product. The product is a concentrated nectar product, having a Brix value of 60% to 70%, or more. A person of skill in the art would appreciate that the nectar product has not undergone any, or has undergone very small occurrences of Maillard reactions. Therefore, the concentrated nectar product does not have the characteristic syrup taste (e.g. there is no caramelization taste due to cooking), as such, it may be used as a natural sweetening agent. This process may also allow for a quick return on investment with very low energy consumption.

In embodiments, under the syrup mode, the system produces a concentrated syrup product having a Brix value between 66% and 67%. The concentrated syrup product has undergone Maillard reactions due to the increase in temperature, thereby, having the characteristic syrup taste (e.g., there is caramelization taste due to the cooking of the sugars). This process may also allow for a quick return on investment with very low energy consumption due to the reutilization of the vapor produced in the system as a heat source.

Referring now to FIG. 1, in accordance with an embodiment, there is provided a process (10) for concentrating Brix in a liquid, the process comprising the steps of providing an evaporation system as described herein (11), providing a liquid (12), the liquid being selected from a group consisting of sap, raw maple sap and sweet vegetal water solution; actioning a steam generator to initiate a first production of steam (13), preheating the liquid to a first preheated temperature (T1) (14) to produce a first preheated liquid, optionally preheating the first preheated liquid to a second preheated temperature T2 (15) to produce a second preheated liquid; feeding the preheated liquid to a bimodal falling film evaporator (16), actioning a recompression unit in vacuum or nectar mode (17); and heating the preheated liquid to a third temperature T3 (18), for example a suitable temperature for obtaining nectar products, for example a temperature between 37° C. and 103° C. to produce a concentrated nectar liquid having a Brix level between 60% and 70% (19). T2 may, for example, be a temperature of 85° C. It will be understood that the value of T2 may be adapted to the characteristics of the concentrated product being produced and of the liquid being provided to the process without departing from the principles disclosed herein.

Figure 2:
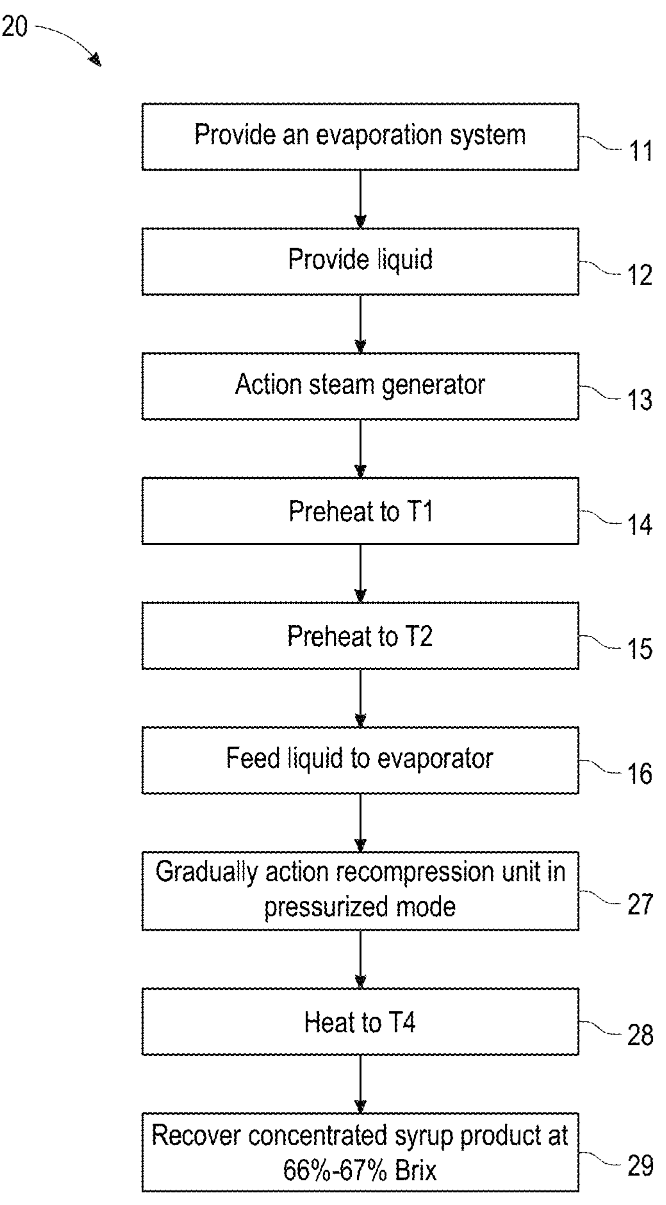
FIG. 2 is a schematic diagram of an evaporation process operating in a pressurized configuration to concentrate Brix in a liquid, according to another embodiment of the present disclosure.

Referring now to FIG. 2, a process (20) according to the present disclosure may comprise feeding the preheated liquid to a bimodal falling film evaporator configured to function under a pressurized configuration. Accordingly, the process may comprise steps (11) to (16) as above, and further comprise actioning a recompression unit to operate in pressurized or syrup mode (27), and heating the second preheated liquid to a fourth temperature T4 (28), for example a temperature suitable for obtaining syrup products, for example a temperature between 85° C. and 103° C., for example between 97° C. and 98° C., to produce a concentrated syrup liquid having a Brix level between 66% and 67% (29).

The processes (10) and (20) may comprise, before the step of providing the liquid, filtering the liquid by means of an ultrafiltration unit to produce a filtered liquid. The processes (10) and (20) may comprise concentrating the liquid by means of a reverse osmosis concentrator to produce a high Brix liquid solution of about 15% to about 40% Brix.

In embodiments, the process may comprise performing at least one of: Brix monitoring, maple sap Brix monitoring, permeate flow reading, pH monitoring and control, conductivity meter readings, preventive management, and high and low pressure protection.

In embodiments, the process may produce a concentrated nectar product that is high in sugar content and its taste, nature and quality have not been altered.

In embodiments, the process may produce a concentrated syrup product that has undergone Maillard reactions and is at least partially caramelized.

Figure 11:
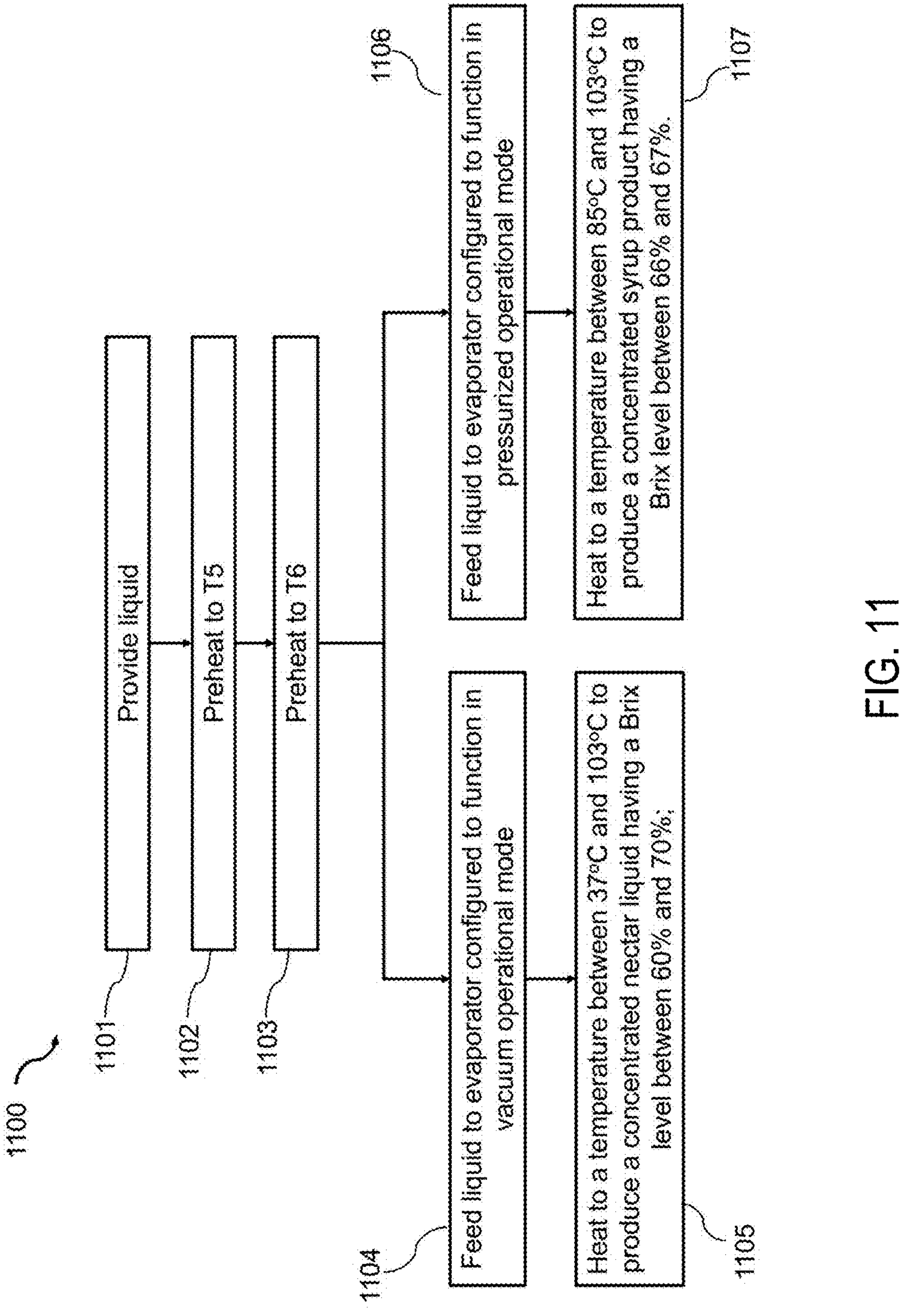
FIG. 11 is a schematic diagram of an evaporation process using a bimodal evaporator according to an embodiment of the present disclosure.

It will be understood that the principles disclosed herein may be implemented with a variety of equipment and configurations, for example with different pressurization and depressurization means, without departing from the present teachings. Referring to FIG. 11, in embodiments, there is provided a process (1100) for concentrating Brix in a liquid, the process comprising the steps of providing the liquid (1101), the liquid being selected from a group consisting of sap, raw maple sap and sweet vegetal water solution; preheating the liquid to a first preheated temperature T5 (1102) to produce a first preheated liquid; optionally preheating the first preheated liquid to a second preheated temperature T6 (1103), feeding the preheated liquid to a bimodal falling film evaporator configured to function under a vacuum configuration (1104); and heating the preheated liquid to a temperature between 37° C. and 103° C., for example between 37° C. and 95° C. to produce a concentrated nectar liquid having a Brix level between 60% and 70% (1105), or feeding the preheated liquid to a bimodal falling film evaporator configured to function under a pressurized configuration (1106) and heating the liquid to a temperature between 85° C. and 103° C., for example between 97° C. and 98° C. to produce a concentrated syrup liquid having a Brix level between 66% and 67% (1107). It will be understood that step (1107) may also be carried out in a vacuum configuration.

It will be understood that the processes (10), (20) and (1100), or other processes carried out according to the principles disclosed herein, need not be mutually exclusive. Accordingly, in some embodiments, the process (10) may be initially carried out to produce a quantity of nectar product in a vacuum configuration at a temperature T3. The vacuum configuration may be switched to a pressurized configuration by adapting the operating parameters of the recompression unit accordingly. The process (20) may then proceed by increasing the temperature of the liquid to T4 and causing at least some Maillard reactions to occur, yielding a concentrated syrup product. The system for implementing processes (10) and (20) provided herein may thus be bimodal.

Figure 3:
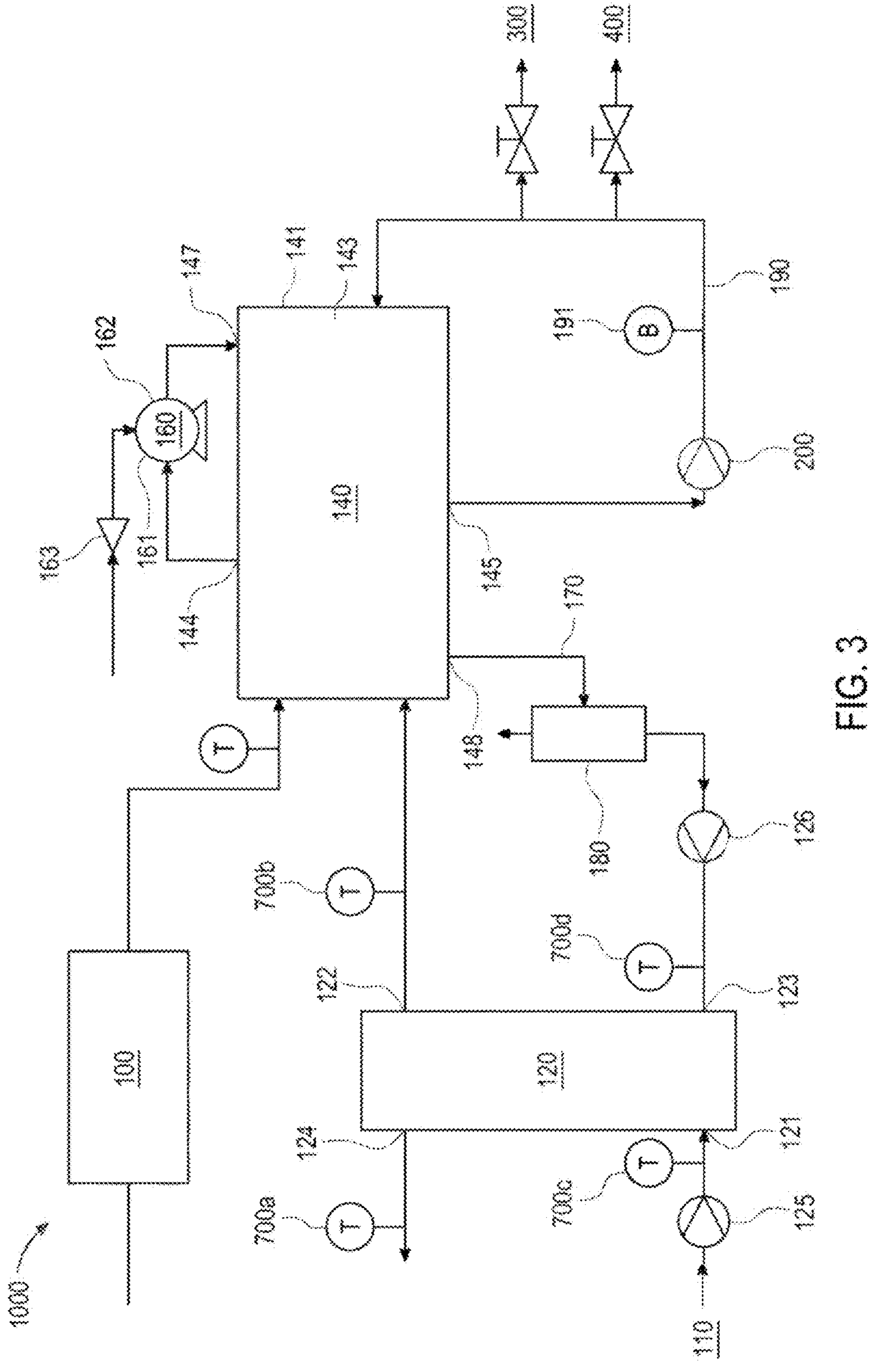
FIG. 3 depicts a schematic diagram of a system for concentrating Brix in a liquid using a bimodal vacuum and pressurized falling film evaporator for producing concentrated nectar and/or concentrated syrup products, according to an embodiment of the present disclosure.

Referring now to FIG. 3, in embodiments, there is provided a system (1000) for concentrating Brix in a liquid, wherein the system (1000) and/or the mechanical vapor recompression unit (160) is adapted to operate under a nectar mode for producing concentrated nectar product (300) and under a syrup mode for producing concentrated syrup product (400). The system (1000) may comprise: a first pump (125) in fluid communication with a main inlet pipe for supplying the liquid (110) into the system (1000); a preheating unit (120) for preheating the liquid (110) at a first temperature (T1), the preheating unit (120) comprising: a first inlet opening (121), a second inlet opening (123), a first outlet opening (122), and a second outlet opening (124), the first inlet opening (121) being in fluid communication with the first pump (125) for pumping the liquid (110) into the preheating unit (120), the second inlet opening (123) being in fluid communication with a second pump (126) for draining condensed water (170) through the preheating unit (120) and through a second outlet opening (124), wherein the liquid flows through the first outlet opening (122) and into the system at the first temperature (T1).

Still referring to FIG. 3, in embodiments, the system may further comprise a falling film evaporator (140) in fluid communication with the first outlet opening (122) of the preheating unit (120), the falling film evaporator is adapted to produce a concentrated product. The falling film evaporator (140) may comprise: (i) a housing (141) comprising an accommodating cavity (143), a top outlet opening (144), a bottom outlet opening (145) in fluid communication with a recirculating pump (200), a first inlet opening (146) in fluid communication with the first outlet opening (122) of the preheating unit (120), a second inlet opening (147), and a first outlet opening (148) in fluid communication with a depressurizing tank (180) that is in fluid communication with the second pump (126) of the preheating unit (120).

Figure 4:
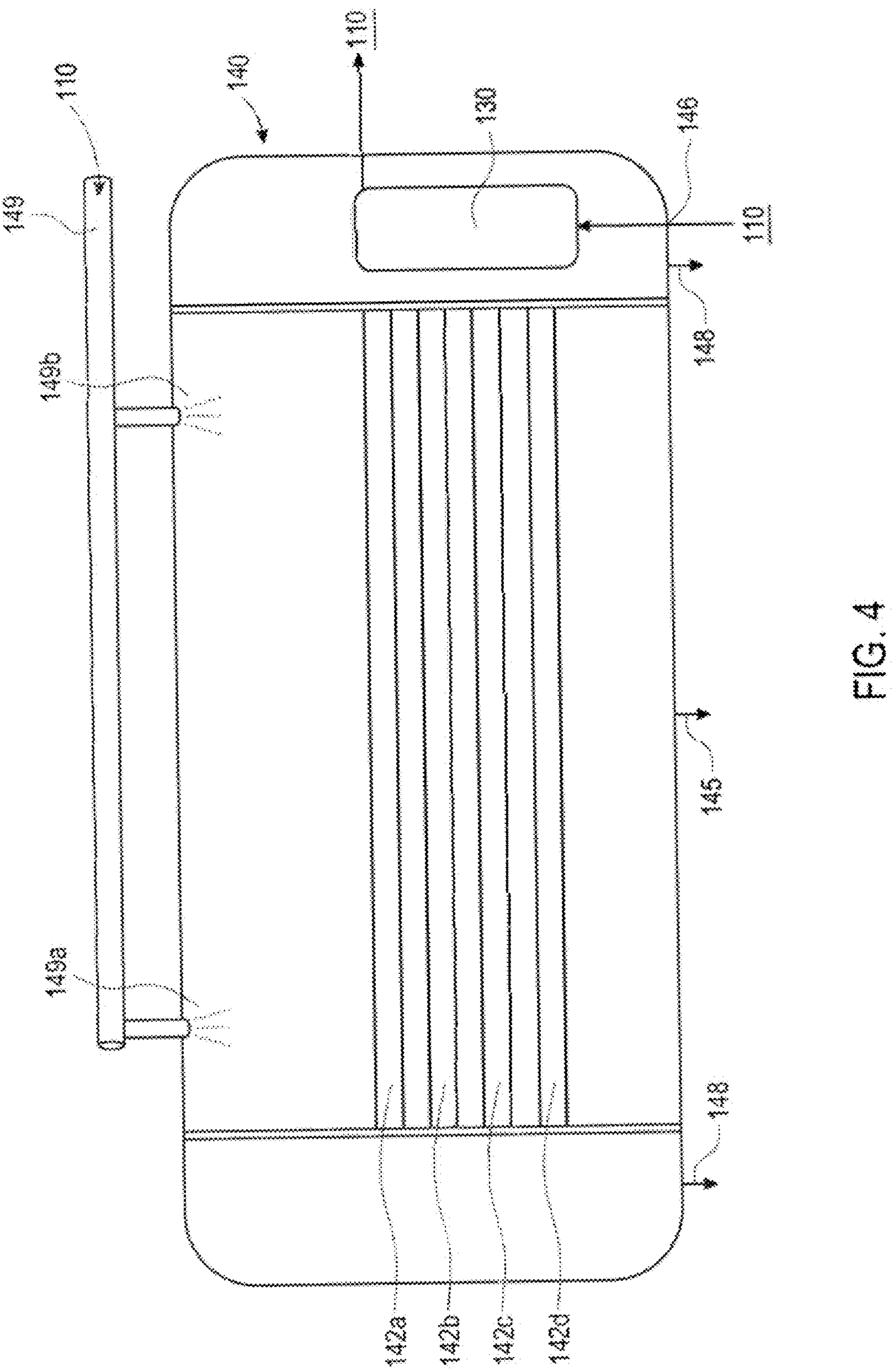
FIG. 4 depicts a detail of a falling film evaporator according to an embodiment of the present disclosure.

Referring now to FIG. 4, additional details of the falling film evaporator are provided. In embodiments, the falling film evaporator (140) may comprise a plurality of heat exchange tubes (142*a*, 142*b*, . . . 142*x*) extending along a longitudinal axis in relation to the housing (141), (ii) a spray tube (149) comprising a plurality of spraying nozzles (149*a*, 149*b*) for spaying the liquid (110) inside the housing (141); and (iii) a heating unit (130) for heating the liquid (110) at a second temperature (T2). It will be understood that the evaporator (140) may comprise any number of heat exchange tubes, according to the throughput and scale of the evaporation step. For example, an evaporator (140) may comprise a greater number of heat exchange tubes, providing a larger heat exchange surface area resulting in faster product concentration. For example, in embodiments, evaporator (140) may comprise less heat exchange tubes and be thereby adapted for a smaller throughput, a slower evaporation or a limited power supply.

It will also be understood that the heating unit (130) receives the liquid (110) from preheating unit (120), when preheating unit (120) is present, and may be configured for heat exchange between the environment inside the evaporator (140) and the liquid (110). Upon exiting heating unit (130), the liquid (110) may be at an intermediate, second temperature T2. The liquid (110) may then be fed into the evaporator (140) through nozzles or other acceptable inlet means suitable in the operation of a falling film evaporator. The pre-heating of liquid (110) using heat present in the cavity (143) of the evaporator (140) provides for increased efficiency of the evaporation step. In particular, a pre-heated liquid (110) will more readily attain the predetermined operating temperature upon contacting the environment of the cavity (143) and the heat exchange tubes. Accordingly, heat use and heat recycling in the system (1000) are improved.

Figure 5:
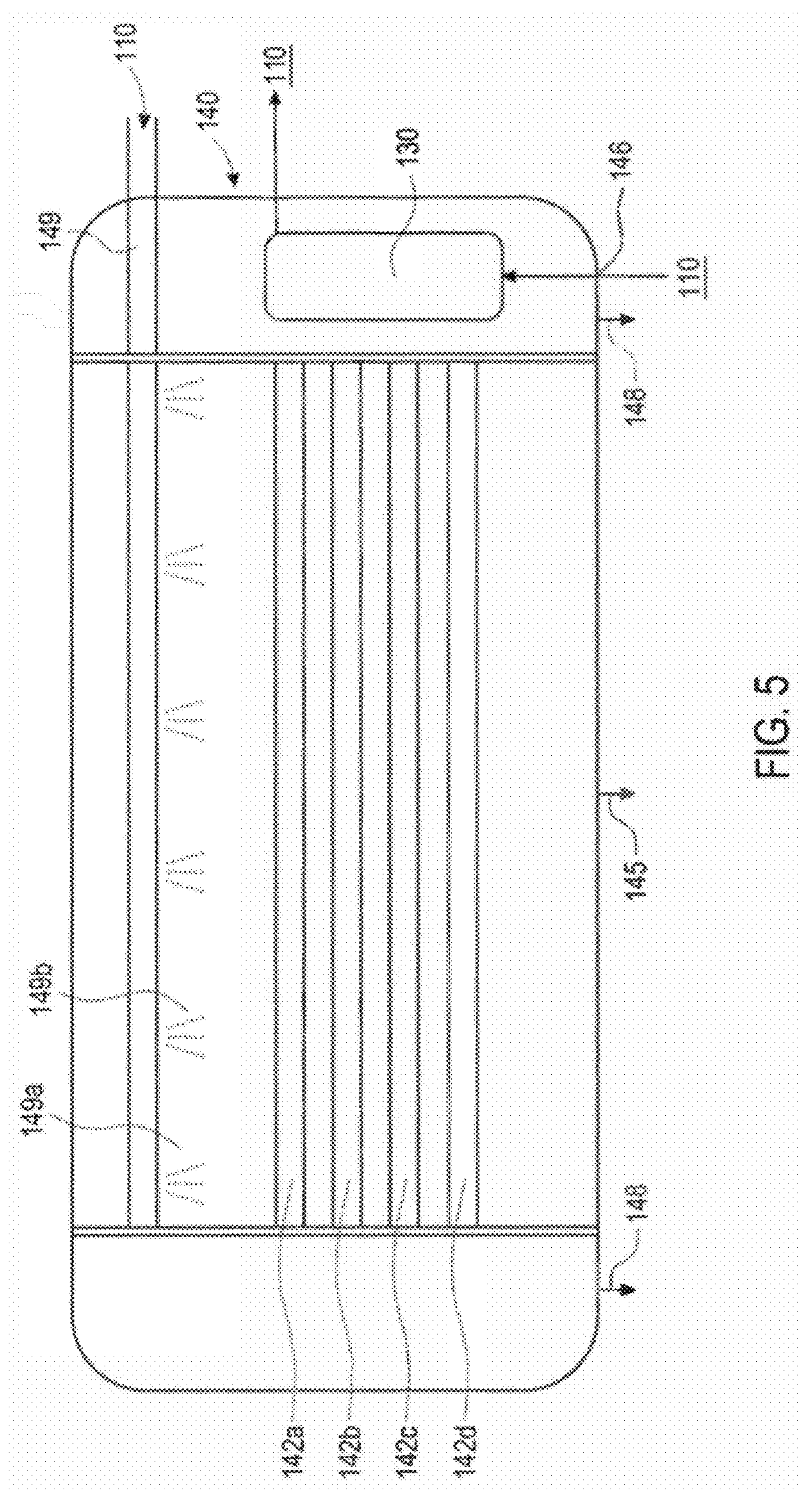
FIG. 5 depicts a detail of a falling film evaporator according to another embodiment of the present disclosure.

Referring to FIGS. 4 and 5, it will be understood that the evaporator (140) may comprise various arrangements of the spray tube (149). For example, the spray tube (149) may extend outside the housing (141) of the evaporator (140), and be in fluid communication with a plurality of spray nozzles (149*a*, 149*b* . . . 149*x*) for spraying the liquid (110) into the evaporator (140). In embodiments, such as an exemplary embodiment depicted in FIG. 5, the spray tube (149) may extend inside the housing (141) of the evaporator (140), and comprise a plurality of spray nozzles (149*a*, 149*b* . . . 149*x*).

Referring back FIG. 3, in embodiments, the system may further comprise a vapor compressor unit, such as a mechanical vapor recompression unit (160), or the like, for compressing and decompressing steam, the mechanical vapor recompression unit (160) comprising: (i) a first inlet opening (161) in fluid communication with the top outlet opening (144) of the falling film evaporator (140); (ii) a first outlet opening (162) in fluid communication with the second inlet opening (147) of the falling film evaporator (140); and (iii) a spraying nozzle (163) for spraying water into the first inlet opening (161) of the mechanical vapor recompression unit (160) to reduce the heat therein.

When vapor recompression unit (160) is a mechanical vapor recompression unit, the heat use and heat recycling efficiency of the system (1000) are improved. The vapor recompression unit (160) receives steam or vapor from the evaporator (140), at least part of the steam or vapor resulting from the evaporation of a portion of the liquid (110). The vapor recompression unit (160) compresses the vapor or steam received from the evaporator (140), causing the temperature of the vapor or steam to increase. The resulting compressed vapor or steam is fed into the evaporator (140), thus providing a source of heat for the evaporation step.

It will be understood that the vapor recompression unit may be configured to operate at very low pressures, including at pressures approaching a vacuum, as well as under atmospheric, near-atmospheric or above-atmospheric pressures. For example, when the evaporator (140) operates in nectar mode, the vapor recompression unit (160) is configured to maintain a low pressure. When the evaporator (140) operates in syrup mode, the vapor recompression unit (160) may be configured to maintain a near-atmospheric pressure, for example a pressure higher than the pressure in nectar mode.

Still referring to FIG. 3, in embodiments, the system may further comprise a main outlet and recirculation pipe (190) in fluid communication with the recirculating pump (200), the main outlet and recirculation pipe (190) comprising a Brix reading apparatus (191) for measuring Brix of the concentrated nectar product (300) and the concentrated syrup product (400).

Still referring to FIG. 3, in embodiments, the system (1000) may comprise a steam generator (100) fluidly coupled to the falling film evaporator (140) for initiating a first production of steam.

Still referring to FIG. 3, in embodiments, the first temperature (T1) may be between 1° C. and 25° C., preferably between 4° C. and 10° C.

Still referring to FIG. 3, in embodiments, the second temperature (T2) may be between 11° C. and 36° C.

In embodiments, (T2) may be higher than (T1).

Still referring to FIG. 3, the first inlet opening (161) of the mechanical vapor recompression unit (160) may operate under the nectar mode or vacuum configuration, preferably between −0.93 ATM gauge to −0.16 ATM gauge (between −14 psig and −2 psig). Accordingly, the vapor recompression unit (160) operating in vacuum mode may maintain a below-atmospheric pressure in the evaporator (140).

Still referring to FIG. 3, in embodiments, the liquid (110) may be heated at a third temperature (T3), for example between 37° C. to 103° C., for example between 37° C. and 95° C.

In accordance to an embodiment, the liquid (110) may be transformed into the concentrated nectar product (300) having a Brix value of 60% to 70%, corresponding to a Brix level of 60% to 70%.

In accordance to another embodiment, still referring to FIG. 3, the vapor recompression unit (160) may operate in a pressurized mode, or syrup mode. In embodiments, operation in the syrup mode may comprise operating the vapor recompression unit (160) at an outlet opening (162) pressure close to atmospheric, for example between 0.068 ATM gauge and 1.02 ATM gauge (between 1 psig and 15 psig). When the vapor recompression unit (160) and/or the system (1000) are configured to operate in pressurized, or syrup mode, the vapor recompression unit maintains a pressure in the evaporator (140) that approaches or exceeds atmospheric pressure, thereby allowing the liquid (110) to evaporate at higher temperatures. For example, maple sap may evaporate at higher temperatures in syrup mode than in nectar mode, thereby undergoing a greater amount Maillard reactions and generating syrup. When the vapor recompression unit (160) operates at an outlet opening (162) pressure between 1 and 15 psi above atmospheric pressure, the vapor compression is increased, providing vapor at a higher temperature into the evaporator (140). It will be understood that variations of the inlet and outlet pressures for the vapor recompression unit (160) adapted to the desired concentrated product are within the scope of this disclosure.

Still referring to FIG. 3, in embodiments, the vapor generated by the system (1000) may be recompressed and reused. For example, the vapor may be recompressed to heat the liquid (110) at a fourth temperature (T4) between 85° C. and 103° C., for example between 97° C. to 98° C., thereby transforming the liquid (110) into the concentrated syrup product (400) having a Brix value of 66% to 67%.

Still referring to FIG. 3, the system (1000) may be configured to process between 50 Lt and 350 Lt, preferably 290 Lt, per hour of the liquid (110) having a Brix value between 30% and 32%, and produce the concentrated nectar product (300) or the concentrated syrup product (400). It will be understood that the throughput of the system (1000) may depend on several factors, including the characteristics of the equipment used and the properties of the feed liquid. For example, increasing the volume of the evaporator (140) or modifying the configuration of the heat exchange tubes (142*a*, 142*b*, . . . 142*x*) may allow the system (1000) to process a higher volume of liquid per hour. It will also be understood that a liquid having a lower Brix level may require longer processing in the system (1000) to achieve a predetermined Brix level for making a concentrated product. Accordingly, the system (1000) remaining the same, increasing the feed Brix of the liquid may allow the system (1000) to process a higher volume of feed liquid per hour.

In embodiments, and still referring to FIG. 3, the housing (141) of the falling film evaporator (140) may have a horizontal and\or a vertical configuration, preferably, the housing (141) of the falling film evaporator (140) has a horizontal configuration. It will be understood that the processes and systems of the present disclosure may be implemented on a variety of evaporators, including vertical falling film evaporators, horizontal falling film evaporators and others, depending on the characteristics of the processing plant, of the liquid (110) and of the final concentrated product.

Still referring to FIG. 3, in embodiments, the system (1000) may comprise a controller (500), the controller may further comprise a processing unit configurable to monitor pressure changes at the first inlet opening (161) and at the first outlet opening (162) of the mechanical vapor recompression unit (160). The controller (500) may be capable of actioning the mechanical vapor recompression unit (160) into the vacuum configuration for the production of the concentrated nectar product (300). The controller (500) may also be capable of actioning the mechanical vapor recompression unit (160) into the pressurized configuration for the production of the concentrated syrup product (400). The controller 500 may also be operatively coupled to a spray nozzle (163) configured to spray water into the inlet opening (161) of the vapor recompression unit (160) to manage the temperature of the resulting compressed vapor and the heat within the vapor recompression unit (160). Accordingly, the controller (500) may action the spray nozzle (163), for example whenever the vapor recompression unit (160) is in operation, or in response to a temperature reading, for example a reading of the temperature of the vapor recompression unit (160), or a reading of the vapor temperature at the outlet opening (162), or another suitable reading exceeding a predetermined threshold.

In embodiments, and still referring to FIG. 3, the controller (500) may comprise an input/output interface, the input/output interface being operatively connectable to an input/output device [not shown] comprising at least one of: a screen, a touchscreen, a keyboard, a camera, and a speaker [not shown]. It will be understood that the system (1000) may be partially or fully automated, and thus require reduced, minimal or no intervention by personnel to monitor or change the operating parameters. Automation may comprise operatively connecting a plurality of monitoring equipment and/or a plurality of control equipment, for example valves, power supplies or heating elements to the controller (500), to a plurality of controllers, or to other suitable automation means and systems.

In embodiments, and still referring to FIG. 3, the system (1000) may comprise a plurality of temperature reading sensors (700*a*, 700*b*, 700*c*, 700*d*, 700*x*) for measuring the temperature in the system (1000) at a plurality of measuring points (700*a*, 700*b*, 700*c*, 700*d*, 700*x*). The temperature sensors may be selected from a group consisting of a thermometer, a negative temperature coefficient (NTC), a thermistor, a resistance temperature detector (RTD), a thermocouple and a semiconductor-based sensor.

In embodiments, the Brix reading apparatus comprises a refractometer (not shown).

In embodiments, the liquid (110) is selected from a group consisting of sap, sweet vegetal water solution and sweet raw vegetal water solution.

Figure 6:
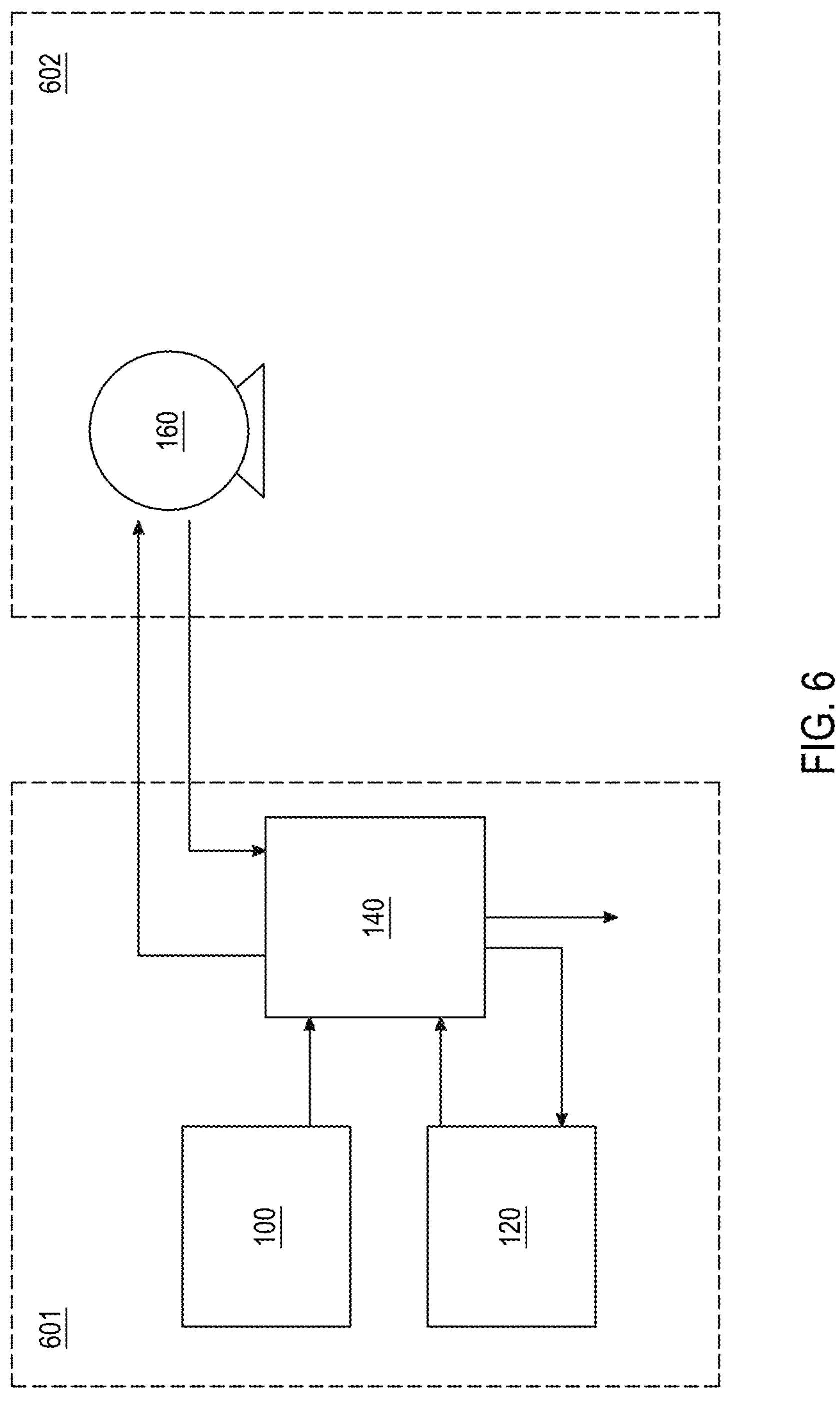
FIG. 6 depicts a schematic diagram of a Brix concentration system disposed across separate spaces according to an embodiment of the present disclosure.

Turning now to FIG. 6, there is provided a system such as exemplary system (1000) for concentrating Brix in a liquid (110), wherein at least one component of the system (1000) is situated in a different area, such as a different building or a different room within the same building. For example, one or more components of the system (1000) may be situated in building 601, with piping or other connecting means connecting the appropriate component to a component situated in building 602. For example, the vapor recompression unit (160) may be located in a separate area, such as a mechanical area. For example, noisier equipment such as compressors may be isolated from other equipment less prone to emitting noise, to increase personnel well-being and to circumscribe the areas of the processing plant where protection, such as hearing protection, must be worn. FIG. 6 shows an exemplary embodiment comprising a piping system for fluidly connecting a falling film evaporator (140) to a mechanical vapor recompression unit (160), wherein the falling film evaporator comprises an inlet opening (147) in fluid communication a first outlet opening (162) of the vapor recompression unit, and a top outlet opening (144) in fluid communication with first inlet opening (161) of the mechanical vapor recompression unit. It will be understood that the piping fluidly connecting the evaporator (140) and the vapor recompression unit (160) may be any kind of appropriate piping, including metal piping, rubber piping, PVC piping, and other acceptable fluid communication means. It will also be understood that the piping may be insulated, for example heat insulated, to maximize heat delivery to the evaporator (140).

Figure 7:
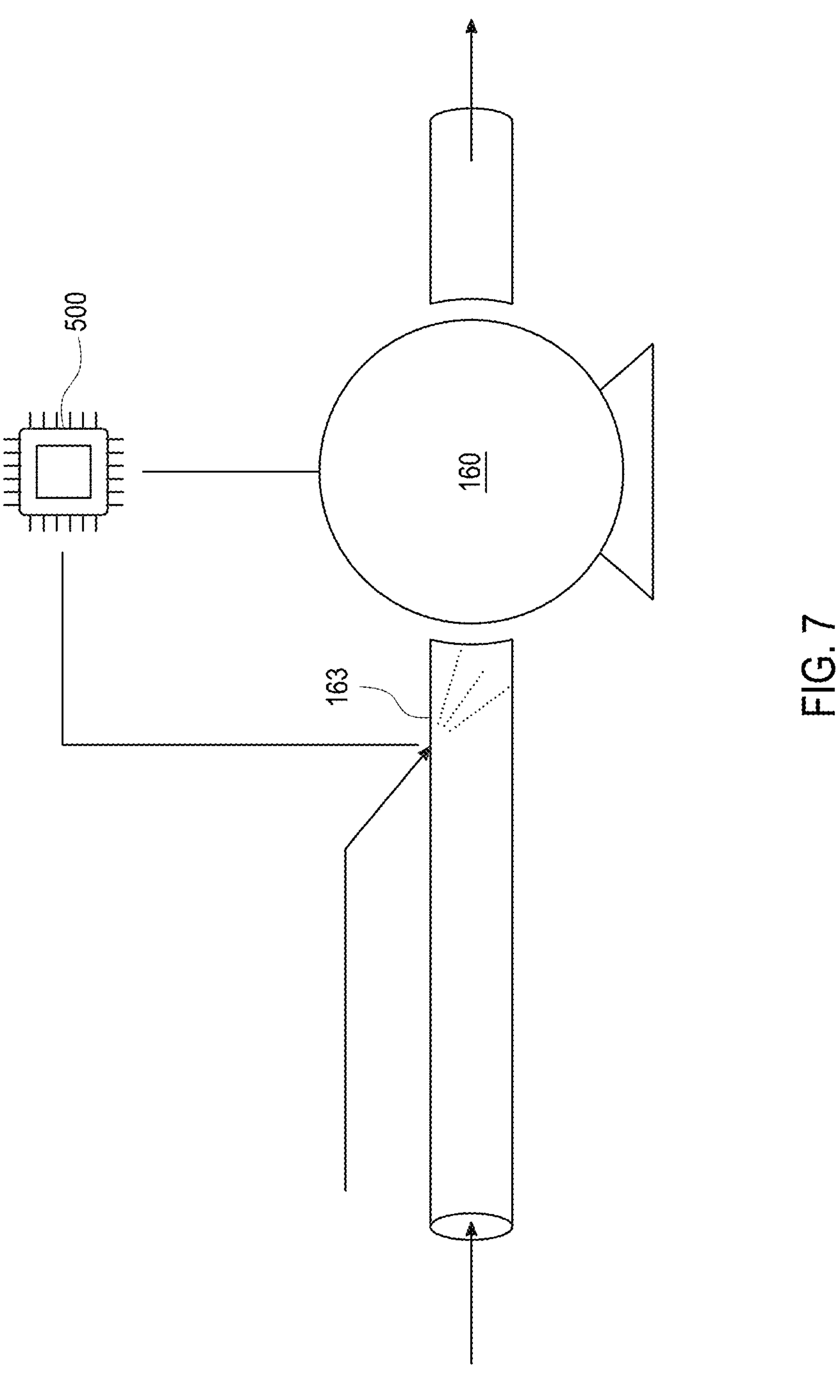
FIG. 7 depicts a detail of a vapor recompression unit according to an embodiment of the present disclosure.
Figure 8:
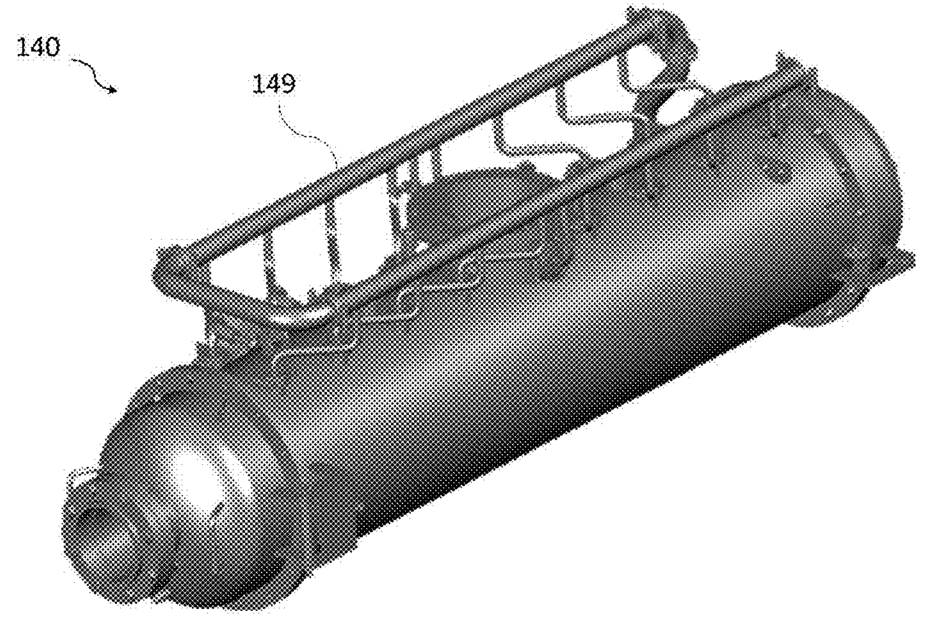
FIG. 8 is an upper perspective view of an evaporator according to an embodiment of the present disclosure.
Figure 9:
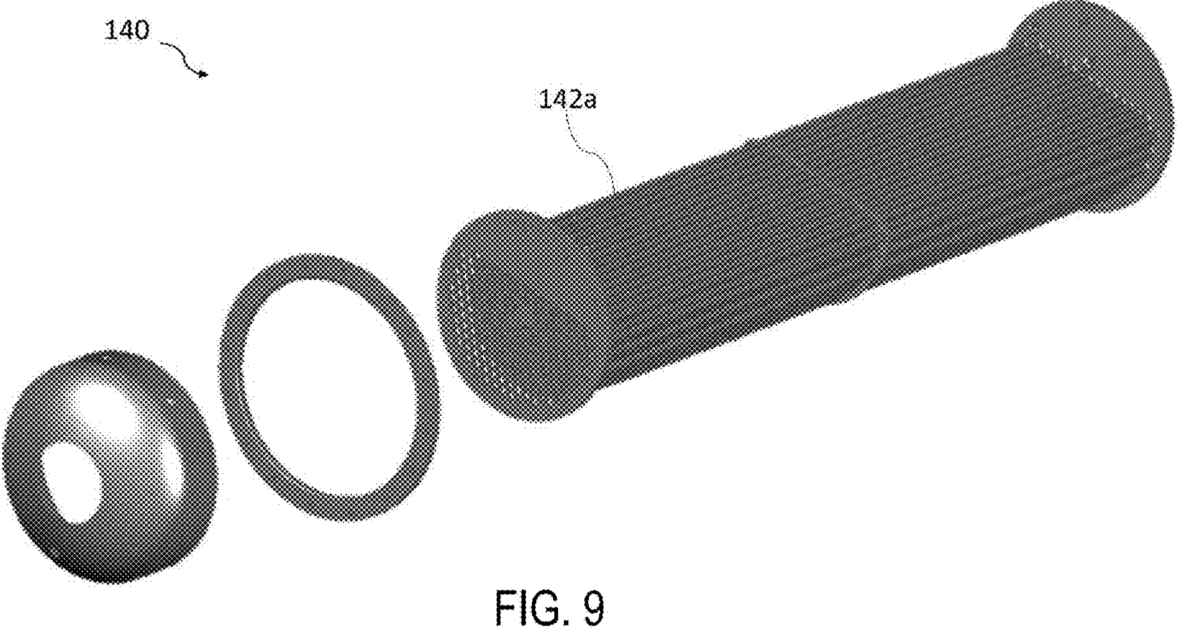
FIG. 9 is a partial exploded view of an evaporator according to the present disclosure.
Figure 10:
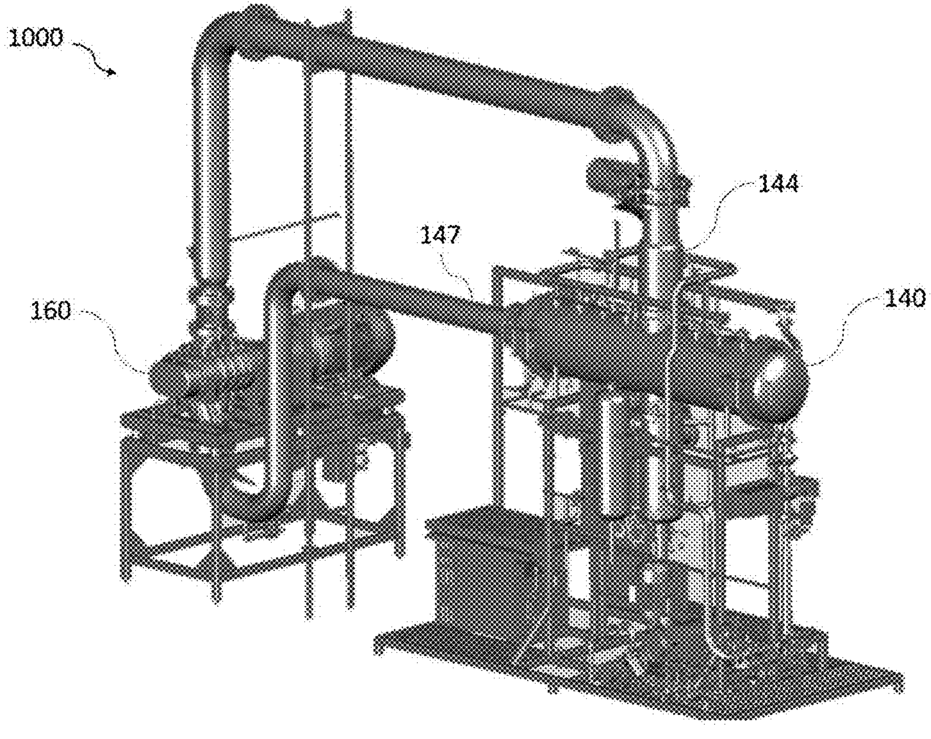
FIG. 10 depicts an embodiment of a system for concentrating Brix in a liquid according to the present disclosure.

Now referring to FIG. 7, in embodiments, there is provided a mechanical vapor recompression unit (160) for compressing and decompressing steam, the mechanical vapor recompression unit (160) comprising: (i) a first inlet opening (161) in fluid communication with the top outlet opening (not shown) of the falling film evaporator (not shown); (ii) a first outlet opening (162) in fluid communication with the second inlet opening (not shown) of the falling film evaporator (not shown); and (iii) a spraying nozzle (163) for spraying water into the first inlet opening (161) of the mechanical vapor recompression unit (160) to reduce the heat therein. A controller (500) may be operatively coupled to the vapor recompression unit (160), to the spraying nozzle (163) and to other components of the system (1000). For example, the controller 500 may be operatively coupled to, and configured to receive data from, one or more of temperature, pressure, level or Brix sensors in the system (1000), and be further configured to execute instructions, for example instructions stored in a memory (not shown), for causing the system (1000) to, maintain or vary a level or levels of temperature, pressure, flowrate and other parameters of the Brix concentration process.

In embodiments, there is provided a process for concentrating Brix in a liquid (110), the process may comprise the steps of: providing the system (1000) (referred to in FIGS. 3 to 7); providing the liquid (110), the liquid being selected from a group consisting of sap and sweet vegetal water solution; actioning the steam generator (100) to initiate a first production of steam, wherein the resulting generated heat is directed from the steam generator (100) to the falling film evaporator (140) exiting through the first outlet opening (148) of the falling film evaporator (140) onto the depressurizing tank (180) and pumped into the preheating unit (120) by the second pump (126) to heat the liquid (110) at the first temperature (T1) to produce a first preheated liquid; feeding the first preheated liquid to the second preheating unit (130) for preheating the liquid (110) at the second temperature (T2) to produce a second preheated liquid; directing the second preheated liquid to the spray tube (149) and spraying the second preheated liquid on the plurality of heat exchange tubes (142*a*, 142*b*, 142*x*) by actioning the plurality of spraying nozzles (149*a*, 149*b*); gradually actioning the mechanical vapor recompression unit (160) to function in the vacuum configuration or nectar mode; heating the second preheated liquid to the third temperature (T3) concentrating the Brix in the liquid between 60% to 70%; and producing the concentrated nectar product (300) having a Brix value between 60% to 70%.

The vapor recompression unit (160) may be configured for gradual actioning, for example by gradually lowering the pressure in the evaporator (140). Gradual reduction in pressure favors a slower release of gases dissolved in the liquid (110), thus reducing foaming.

In embodiments, the process using the system (1000) (referred to in FIGS. 3 to 7) may comprise, after the step of directing the second preheated liquid to the spray tube (149) and spraying the second preheated liquid on the plurality of heat exchange tubes (142*a*, 142*b*, 142*x*) by actioning the plurality of spraying nozzles (149*a*, 149*b*), actioning the mechanical vapor recompression unit (160) to function in the pressurized configuration or syrup mode; heating the liquid (110) to the fourth temperature (T4) concentrating the Brix in the liquid between 66% and 67%; and producing the concentrated syrup product (400) having a Brix value between 66% and 67%.

In embodiments, the process using the system (1000) (referred to in FIGS. 3 to 7) may further comprise, before the step of providing the liquid (110), filtering the liquid by means of an ultrafiltration unit to produce a filtered liquid. The process using the system (1000) (referred to in FIGS. 3 to 7) may comprise, before the step of providing the liquid (110), concentrating the Brix in the liquid by means of a reverse osmosis concentrator to produce a high Brix liquid solution of about 15% to about 40% Brix.

In embodiments, the process using the system (1000) (referred to in FIGS. 3 to 7) may further comprise performing at least one of: Brix monitoring, maple sap Brix monitoring, permeate flow reading, pH monitoring and control, conductivity meter readings, preventive management, and high and low pressure protection.

In embodiments, the process using the system (1000) (referred to in FIGS. 3 to 7), may produce a concentrated nectar product (300) which may be high in sugar content and its taste, nature and quality have not been altered and/or a concentrated syrup product (400) which may have undergone Maillard reactions and may be at least partly caramelized.

The system (1000) may be configured to recover the concentrated products, for example a nectar product (300) and/or a syrup product (400) in response to a reading provided a Brix measuring means, for example in response to receiving a reading from a Brix meter (191). This process may be automated, for example through configuring a controller, such as controller (500), to actuate valves or other fluid direction means (not shown) to withdraw the liquid 110 from the main outlet and recirculation pipe (190) when the Brix reading on Brix meter (191) reaches a predetermined threshold.

The Brix meter may comprise any or several Brix measuring technologies, including but not limited to refractometry, microwave technology and others. For example, the Brix meter may be a microwave Brix meter.

The principles described herein provide an advantageous method and system for concentrating Brix in a liquid. For example, one advantage of the present disclosure comprises recovering concentrated products based on a Brix reading, for example a Brix reading provided in real time. This improves the precision, consistency and reliability of the concentrated products produced using the systems and methods of the present disclosure compared to current methods and systems of concentrating Brix in a liquid.

In another example, the principles described herein provide the possibility of continuous, rather than batch operation of an evaporator, for example a falling film evaporator for concentrating Brix in a liquid. Accordingly, a liquid (110) may be continuously fed to a system (1000) operating in vacuum or pressurized mode, the system (1000) being at or near an equilibrium, wherein the conditions of pressure, temperature and flowrate allow the overall Brix in the liquid (110) comprised within the system (1000) to remain at or close to the predetermined Brix level for a concentrated product, thus allowing for continuous feeding of the liquid (110) and continuous withdrawal of a concentrated product (300, 400) having a predetermined Brix level. Characteristics of a Brix concentration operation such as throughput and downtime are thus improved.

In another example, the systems and processes described herein provide improved liquid concentration means by allowing liquid concentration to proceed in at least two modes, i.e. at least vacuum and pressurized modes using the same equipment. Use of the equipment is thus more readily adapted to satisfy changes in market demand, for example by addressing the seasonality of syrup demand while maintaining the capacity for manufacturing a minimally caramelized sweetening product such as nectar.

The one or more embodiments described above are intended to be exemplary only.

The invention claimed is:

1. A system for concentrating Brix in a liquid, the system comprising:

a falling film evaporator comprising: (i) a housing including an accommodating cavity, a plurality of heat exchange tubes mounted in the accommodating cavity and extending along a longitudinal axis in relation to the housing, a top outlet opening provided on the top of the housing for expelling steam from the housing, a bottom outlet opening provided on the bottom of the housing for expelling a concentrated liquid from the housing, a first inlet opening for receiving a feed liquid into the housing from a preheating unit, a second inlet opening for receiving steam from a mechanical vapor recompression unit, and a first outlet opening for expelling condensed water from the housing; (ii) at least one spray tube comprising at least one spraying nozzle for spraying the feed liquid inside the housing; and (iii) a heating unit in fluid communication with the at least one spray tube;

the preheating unit for preheating the feed liquid to a first temperature (T1), the preheating unit comprising: a first inlet opening, a first outlet opening, a second inlet opening, and a second outlet opening, wherein the feed liquid flows through the first outlet opening and into the falling film evaporator at the first temperature (T1);

a first pump, the first pump being in fluid communication with a main inlet pipe and with the first inlet opening of the preheating unit, the first pump being adapted for pumping the feed liquid from the main inlet pipe into the preheating unit via the first inlet opening of the preheating unit, the first outlet opening of the preheating unit being in fluid communication with the heating unit of the evaporator for conveying the feed liquid from the preheating unit into the heating unit of the evaporator where the feed liquid is heated to a second temperature (T2), the feed liquid heated at the second temperature (T2) being then conveyed toward the at least one spray tube of the falling film evaporator;

a depressurizing tank in fluid communication with the first outlet opening of the housing for receiving condensed water from the evaporator;

a second pump for draining condensed water from the depressurizing tank through the preheating unit, the second pump being in fluid communication with the depressurizing tank and with the second inlet opening of the preheating unit, the condensed water received in the preheating unit from the depressurizing pump being expelled from the preheating unit via the second outlet opening of the preheating unit;

the mechanical vapor recompression unit for compressing and decompressing steam, received from the housing, the mechanical vapor recompression unit comprising: (i) a first inlet opening in fluid communication with the top outlet opening of the housing; (ii) a first outlet opening in fluid communication with the second inlet opening of the housing; and (iii) a spraying nozzle for spraying water into the first inlet opening of the mechanical vapor recompression unit to reduce the heat therein;

a recirculation pump in fluid communication with the bottom outlet opening of the housing and with a main outlet and recirculation pipe, the main outlet and recirculation pipe being in fluid communication with the housing for recirculating at least a portion of the concentrated liquid expelled from the housing back into the housing, the main outlet and recirculation pipe comprising a Brix meter for measuring Brix of the concentrated liquid circulating in the main outlet and recirculation pipe, the main outlet and recirculation pipe being provided with a valve allowing withdrawal of a portion of the concentrated liquid circulating in the main outlet and recirculation pipe;

wherein the system and/or the mechanical vapor recompression unit is adapted to operate under a nectar mode for producing concentrated nectar product and under a syrup mode for producing concentrated syrup product.

2. The system of claim 1, further comprising a steam generator in fluid communication with the falling film evaporator for initiating a first production of steam.

3. The system of claim 1, wherein the first temperature (T1) is between 1° C. and 25° C.

4. The system of claim 3, wherein the first temperature (T1) is between 4° C. and 10° C.

5. The system of claim 1, wherein the second temperature (T2) is between 11° C. to 36° C.

6. The system of claim 1, wherein the first inlet opening of the mechanical vapor recompression unit operates under the nectar mode between −0.93 ATM gauge to −0.16 ATM gauge.

7. The system of claim 6, wherein the falling film evaporator is configured to heat the feed liquid to a third temperature (T3) between 37° C. to 103° C.

8. The system of claim 1, wherein the first outlet opening of the mechanical vapor recompression unit operates under the syrup mode between 0.068 ATM gauge and 1.02 ATM gauge.

9. The system of claim 8, wherein the falling film evaporator is configured to heat the feed liquid to a fourth temperature (T4) between 85° C. to 103° C.

10. The system of claim 1, wherein the falling film evaporator is a horizontal falling film evaporator.

11. The system of claim 1, wherein the feed liquid is selected from the group consisting of sap, sweet vegetal water solution and sweet raw vegetal water solution.

12. The system of claim 1, wherein the system is configured for continuous operation.

13. The system of claim 1, wherein the system further comprises a controller coupled to the Brix meter and to the valve for controlling the same to withdraw the concentrated liquid from the main outlet and recirculation pump.

14. The system of claim 1, wherein the concentrated liquid is at least one of a concentrated nectar product or a concentrated syrup product.

15. A process for concentrating Brix in a liquid, the process comprising the steps of:

providing a system according to claim 2;

providing the feed liquid;

actioning the steam generator to initiate a first production of steam, wherein the resulting steam generated is directed from the steam generator to the falling film evaporator and condensed water thereafter exits through the first outlet opening of the housing into the depressurizing tank and is pumped into the preheating unit by the second pump to heat the feed liquid to the first temperature (T1) to produce a first preheated liquid;

feeding the first preheated liquid to the heating unit for preheating the first preheated liquid to the second temperature (T2) to produce a second preheated liquid;

directing the second preheated liquid to the at least one spray tube and spraying the second preheated liquid on the plurality of heat exchange tubes by actioning at least one spraying nozzle;

and further comprising:

actioning the mechanical vapor recompression unit to function in the nectar mode, heating the second preheated liquid to a third temperature (T3) concentrating the Brix in the concentrated liquid between 60% to 70% and recovering the concentrated nectar product having a Brix value between 60% to 70%, or actioning the mechanical vapor recompression unit to function in the syrup mode, heating the second preheated liquid to a fourth temperature (T4) concentrating the Brix in the concentrated liquid between 66% and 67% and recovering the concentrated syrup product having a Brix value between 66% and 67%.

16. The process of claim 15, comprising performing at least one of: brix monitoring, maple sap Brix monitoring, permeate flow reading, pH monitoring and control, conductivity meter readings, preventive management, and or high and low pressure protection.

17. A process for concentrating Brix in a liquid in a system according to claim 1, the process comprising the steps of:

providing the feed liquid;

preheating the feed liquid to a first preheated temperature to produce a first preheated liquid;

preheating the first preheated liquid to a second preheated temperature to produce a second preheated liquid;

and further comprising:

feeding the second preheated liquid to the falling film evaporator configured to function under the nectar mode and heating the second preheated liquid to a temperature between 37° C. and 103° C. to produce a concentrated nectar product having a Brix level between 60% and 70%, or feeding the second preheated liquid to the falling film evaporator configured to function under the syrup mode and heating the second preheated liquid to a temperature between 85° C. and 103° C. to produce a concentrated syrup product having a Brix level between 66% and 67%.

18. The process of claim 17, comprising performing at least one of: brix monitoring, maple sap Brix monitoring, permeate flow reading, pH monitoring and control, conductivity meter readings, preventive management, and or high and low pressure protection.

19. The process of claim 17, wherein the process further comprises recovering the concentrated nectar product or the concentrated syrup product in response to receiving a reading from the Brix meter.

* * * * *